United States Patent
Ishikawa et al.

(10) Patent No.: US 10,077,824 B2
(45) Date of Patent: Sep. 18, 2018

(54) TENSIONER

(71) Applicant: TSUBAKIMOTO CHAIN CO., Osaka-shi, Osaka (JP)

(72) Inventors: Yuichiro Ishikawa, Osaka (JP); Kohei Kunimatsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 146 days.

(21) Appl. No.: 15/167,008

(22) Filed: May 27, 2016

(65) Prior Publication Data

US 2016/0348765 A1     Dec. 1, 2016

(30) Foreign Application Priority Data

May 29, 2015  (JP) .................................. 2015-109391

(51) Int. Cl.
*F16H 7/22* (2006.01)
*F16H 7/08* (2006.01)

(52) U.S. Cl.
CPC ............ *F16H 7/08* (2013.01); *F16H 7/0836* (2013.01); *F16H 2007/0814* (2013.01); *F16H 2007/0859* (2013.01); *F16H 2007/0878* (2013.01); *F16H 2007/0893* (2013.01)

(58) Field of Classification Search
CPC ..... F16H 2007/0806; F16H 2007/0859; F16H 7/0848; F16H 2007/0812; F16H 2007/0853
USPC ........................................................ 474/110
See application file for complete search history.

(56) References Cited

U.S. PATENT DOCUMENTS

| | | | |
|---|---|---|---|
| 5,601,505 A * | 2/1997 | Tada .......................... | F01L 1/02 474/110 |
| 5,637,047 A * | 6/1997 | Schulze ................ | F16H 7/0848 474/110 |
| 5,935,031 A * | 8/1999 | Tada ..................... | F15B 21/044 474/101 |
| 5,967,921 A * | 10/1999 | Simpson .................. | F16H 7/08 474/110 |
| 6,120,402 A * | 9/2000 | Preston ..................... | F16H 7/08 474/109 |
| 6,244,981 B1 * | 6/2001 | Simpson ............... | F16H 7/0848 474/110 |
| 6,361,458 B1 * | 3/2002 | Smith ................... | F16H 7/0848 474/109 |
| 6,602,154 B1 * | 8/2003 | Guichard .................. | F16H 7/08 474/101 |

(Continued)

FOREIGN PATENT DOCUMENTS

| JP | 2001-214928 A | 8/2001 |
|---|---|---|
| JP | 2002-5249 A | 1/2002 |

(Continued)

*Primary Examiner* — Henry Y Liu
(74) *Attorney, Agent, or Firm* — Westerman, Hattori, Daniels & Adrian, LLP (57) ABSTRACT

To provide a simple-structured tensioner that can maintain good sliding properties of and hydraulic pressure for the plunger. The tensioner 10 includes a sleeve 30 inserted into a cylindrical body hole 21, a plunger 40 inserted in the sleeve 30 such as to be able to advance and retract along an axial direction of the sleeve 30, and biasing unit 60 for biasing the plunger 40 toward a front side. The sleeve 30 has, at a front end of a sleeve body 31 thereof, a flange part 33 extending radially outward.

6 Claims, 8 Drawing Sheets

(56) References Cited

U.S. PATENT DOCUMENTS

| | | | |
|---|---|---|---|
| 6,935,978 B2* | 8/2005 | Hayakawa | F16H 7/0836 474/109 |
| 7,037,229 B2* | 5/2006 | Hayakawa | F01L 1/02 474/101 |
| 7,070,528 B2* | 7/2006 | Emizu | F16H 7/0836 474/109 |
| 7,186,195 B2* | 3/2007 | Hellmich | F16H 7/0848 474/101 |
| 7,189,175 B2* | 3/2007 | Maino | F16H 7/0848 474/110 |
| 7,775,921 B2* | 8/2010 | Izutsu | F16H 7/0848 474/109 |
| 7,850,559 B2* | 12/2010 | Botez | F16H 7/0848 474/101 |
| 8,257,212 B2* | 9/2012 | Yoshimura | F16H 7/0836 474/101 |
| 8,727,922 B2* | 5/2014 | Perissinotto | F16H 7/0836 474/110 |
| 8,888,624 B2* | 11/2014 | Bauer | F16H 7/08 474/110 |
| 2002/0098932 A1* | 7/2002 | Hashimoto | F16H 7/0848 474/110 |
| 2004/0138018 A1* | 7/2004 | Hayakawa | F16H 7/0836 474/122 |
| 2004/0210199 A1* | 10/2004 | Atterbury | A61M 5/31535 604/224 |
| 2008/0220390 A1* | 9/2008 | Klein | A61C 1/084 433/76 |
| 2008/0318717 A1* | 12/2008 | Kurematsu | F16H 7/0848 474/110 |
| 2010/0222167 A1 | 9/2010 | Chekansky et al. | |
| 2013/0190116 A1 | 7/2013 | Chekansky et al. | |
| 2013/0324336 A1 | 12/2013 | Chekansky et al. | |

FOREIGN PATENT DOCUMENTS

| | | |
|---|---|---|
| JP | 2002-206603 | 7/2002 |
| JP | 2005-324598 A | 11/2005 |
| JP | 2005-348525 A | 12/2005 |
| JP | 2009-2495 A | 1/2009 |
| JP | 2010-534803 A | 11/2010 |
| JP | 5381381 B2 | 1/2014 |
| KR | 10-2010-0061461 A | 6/2010 |
| WO | 2009/015174 A1 | 1/2009 |

* cited by examiner

TENSIONER

BACKGROUND OF THE INVENTION

1. Field of the Invention

The present invention relates to a tensioner that provides appropriate tension to a running chain, belt, or the like.

2. Description of the Related Art

It has been common practice to use a tensioner in order to maintain appropriate tension in a chain or the like. For example, a known chain guide mechanism, which uses a tensioner lever to slidably guide a transmission chain such as an endless roller chain passing over respective sprockets of a crankshaft and a casts shaft inside an engine room, biases the tensioner lever by using a tensioner in order to maintain appropriate tension of the chain or the like.

Figure 10:
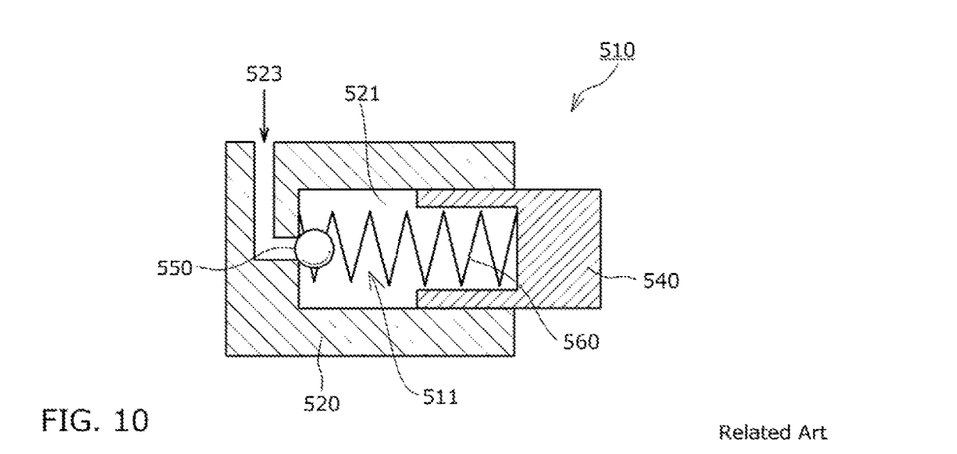
FIG. 10 is an illustrative diagram showing a conventional tensioner.

The known tensioner 510 used in such a chain guide mechanism includes, for example, as shown schematically in FIG. 10, a tensioner body 520 having a cylindrical body hole 521 with an open end, a plunger slidably inserted in the cylindrical body hole 521, and biasing unit 560 for biasing the plunger 540 toward a front side (see, for example, Japanese Patent Application Laid-open No. 2009-002495).

In this tensioner 510, oil is supplied from an oil supply hole 523 formed in the tensioner body 520, so that an oil pressure chamber 511 forced between the cylindrical body hole 521 and the plunger 540 is filled with the oil. This oil biases the plunger 540 toward the front side. A check valve 550 (schematically shown as a check ball) stops the oil from flowing oat from the oil supply hole 523. As the plunger 540 reciprocates, the oil flows through the small gap between the plunger 540 and the cylindrical body hole 521, and the flow resistance provides the damping effect of slowing down the reciprocal movement of the plunger 540.

One problem with the tensioner 510 described above is that, since the tensioner body 520 is a die-cast product made of cast iron or aluminum alloy, the cylindrical body hole 521 in which the plunger 540 slides needs to be subjected to film formation by coating, or smoothing, or machining and the like, in order to achieve surface precision and durability for the purpose of preventing wear and seizure of the plunger 540.

Figure 11:
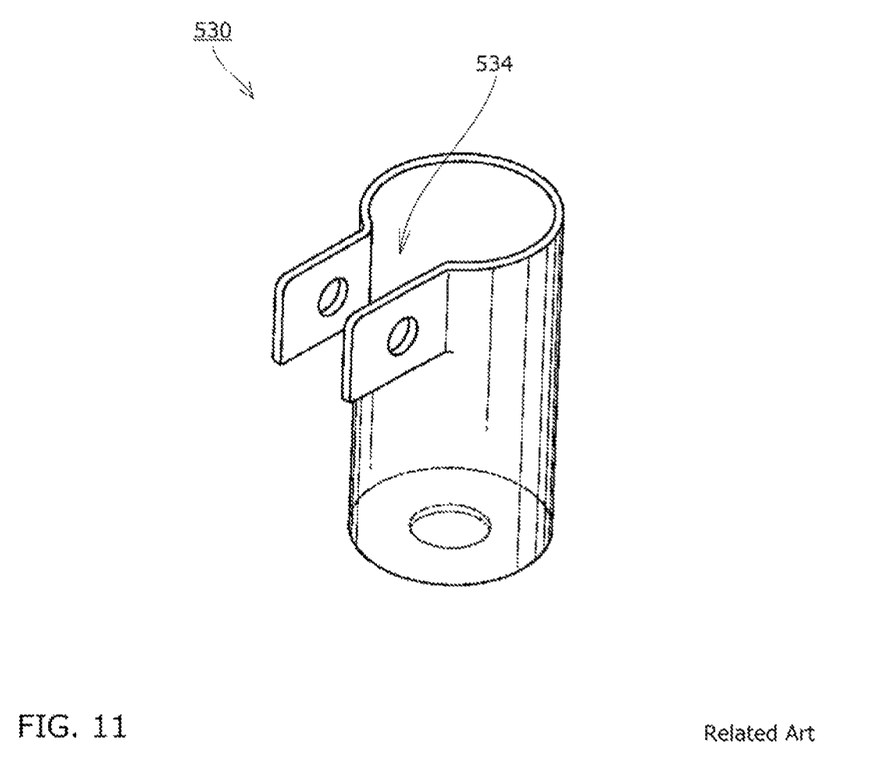
FIG. 11 is a perspective view illustrating a conventional sleeve.

One measure that has been proposed to be taken when the surface precision and durability of the cylindrical body hole 521 are not satisfactory is to interpose a separate component, such as a metal sleeve 530 shown in FIG. 11, between the inner circumferential surface of the cylindrical body hole 521 and the outer circumferential surface of the plunger 540 so as to allow selection of materials for the tensioner body 520 and to achieve a certain degree of design freedom with respect to the treatment of the inner circumferential surface of the cylindrical body hole 521 (see, for example, Japanese latent Application. Laid-open No. 2002-206603).

SUMMARY OF THE INVENTION

In the tensioner 510, sometimes, a ratchet pawl pivotably attached to the tensioner body 520 and making engagement with the outer circumferential surface of the plunger 540 as described in Japanese Patent Application Laid-open No. 2002-206603, or a resilient ring having an annular resilient portion that makes engagement with the outer circumferential surface of the plunger 540 as described in Japanese Patent Application Laid-open No. 2002-5249, is used for the purpose of restricting the retracting movement of the plunger 540.

If such a ratchet pawl or resilient ring is to be set in the tensioner 510, a cut-out indentation 534 needs to be formed to the sleeve 530 as shown in FIG. 11 by cutting out a circumferential portion of the front end of the sleeve toward the rear side. However, when such a cut-out indentation 534 is formed, the sleeve 530 is prone to distortion at the front end thereof, and such distortion in the sleeve 530 may deteriorate the sliding properties of the plunger 540 inside the sleeve 530, or lower the ability to maintain hydraulic pressure between the sleeve 530 and the plunger 540.

The present invention is directed at solving these problems and it is an object of the invention to provide a simple-structured tensioner that can maintain good sliding properties of and hydraulic pressure tor the plunger.

The present invention solves the problems described above by providing a tensioner including a sleeve inserted into a cylindrical body hole with an open end of a tensioner body, a plunger inserted in the sleeve such as to be able to advance and retract along an axial direction of the sleeve, and biasing unit for biasing the plunger toward a front side, the sleeve having, at a front end of a sleeve body thereof, a flange part extending radially outward.

According to the invention set forth in claim 1, a radially outwardly extending flange part is formed at a front end of a sleeve body of the sleeve that is interposed between an inner circumferential wall of the cylindrical body hole and an outer circumferential surface of the plunger so that the front end of the sleeve is reinforced and distortion at the front end of the sleeve can be reduced, which in turn allows the sliding properties of the plunger inside the sleeve and the ability to maintain hydraulic pressure between the sleeve and the plunger to be maintained favorably.

Moreover, since a certain strength of the sleeve at the front end thereof can be secured by the formation of the flange part, the sleeve thickness can be made smaller.

According to the invention set forth in claim 2, the sleeve has a cut-out indentation formed by cutting out a circumferential portion of the front end of the sleeve toward a rear side. Therefore, even though a cut-out indentation is formed in the sleeve for setting a resilient ring or ratchet pawl to restrict the retracting movement of the plunger, the possibility of sleeve distortion at the front end thereof can be reduced by forming the flange part on the outer circumference at the front end of the sleeve body.

According to the invention set forth in claim 3, the flange part includes an anti-rotation portion in an outer circumferential part thereof, and the sleeve is stopped from rotating relative to the tensioner body by the anti-rotation portion making circumferential engagement with the inner circumferential wall of the cylindrical body hole. This way, the sleeve can be stopped from rotating relative to the tensioner body with the use of the flange part having excellent strength, and thus the sleeve can be stopped from rotating relative to the tensioner body while distortion of the sleeve is minimized. Moreover, since the flange part extends radially outward of the sleeve body, the anti-rotation portion can be readily formed.

According to the invention set forth in claim 4, the flange part includes a fitting bump formed by a protruding outer circumferential part thereof, and is press-fitted to the inner circumferential wall of the cylindrical body hole. This way, the sleeve can be readily press-fitted to the tensionser body with the use of the flange part having excellent strength, and thus the sleeve can be press-fitted to the tensioner body while distortion of the sleeve is minimized. Moreover, since the flange part extends radially outward of the sleeve body, the fitting bump can be readily formed.

According to the invention set forth in claim 5, the cylindrical body hole includes a small-diameter part in which the sleeve body is disposed, and a large-diameter part which is formed on a front side of the small-diameter part and in which the flange part is disposed. This way, the gap between the inner circumferential wall of the cylindrical body hole and the outer circumferential surface of the sleeve body can be maintained small over a length along the axial direction. The inner circumferential wall of the cylindrical body hole includes an inner wall step formed between an inner circumferential wall of the small-diameter part and an inner circumferential wall of the large-diameter part, and a gap is formed between the flange part and the inner wall step that face each other in the axial direction. Therefore, machining swarf that tends to be created when press-fitting the flange part to the inner circumferential wall of the large-diameter part of the cylindrical body hole can be accommodated in the gap between the flange part and the inner wall step, and so entrance of the machining swarf in between the inner circumferential wall of the small-diameter part of the cylindrical body hole and the outer circumferential surface of the sleeve body is minimized, which enables smooth and correct insertion of the sleeve into the cylindrical body hole.

According to the invention set forth in claim 6, a gap between the flange part and the inner wall step has a volume larger than a designed volume of an overlapping portion between an outer circumference of the flange part and the inner circumferential wall of the large-diameter part. Therefore, machining swarf that was created when press-fitting the flange part to the inner circumferential wall of the large-diameter part of the cylindrical body hole can be sufficiently accommodated in the gap between the flange part and the inner wall step, and so entrance of the machining swarf in between the inner circumferential wall of the small-diameter part of the cylindrical body hole and the outer circumferential surface of the sleeve body can be prevented reliably.

According to the invention in another embodiment, an annular resilient fit member is disposed between the inner circumferential surface of the cylindrical body hole and the outer circumferential surface of the sleeve body, and the sleeve is fixed to the tensioner body by deforming the resilient fit member. This way, the sleeve can be fixed to the tensioner body reliably without being distorted.

DESCRIPTION OF THE PREFERRED EMBODIMENTS

A tensioner 10 according to a first embodiment of the present invention will be described with reference to the drawings.

Figure 1:
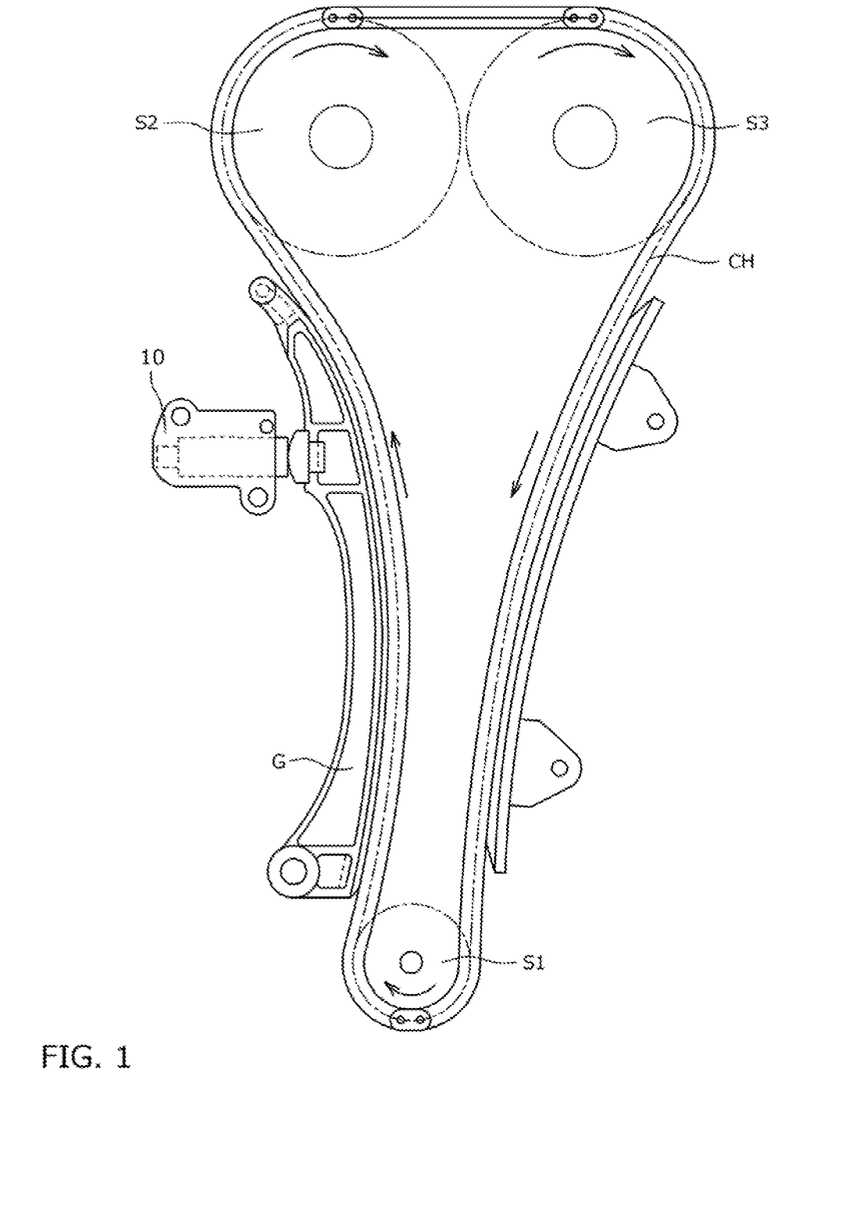
FIG. 1 is an illustrative diagram showing a timing system in which a tensioner according to a first embodiment of the present invention is incorporated.

First, the tensioner 10 of this embodiment is incorporated in a chain transmission used in a timing system or the like of a car engine. As shown in FIG. 1, the tensioner is attached to an engine block (not shown) to apply appropriate tension to the slack side of a transmission chain CH passing over a plurality of sprockets S1 to S3 via a tensioner lever G to reduce vibration during the drive.

The tensioner 10 includes, as shown in FIGS. 2 to 7, a tensioner body 20 having a cylindrical body hole 21, a sleeve 30 inserted in the cylindrical body hole 21, a plunger 40 inserted in the sleeve 30 such as to be able to advance and retract along the axial direction of the sleeve 30, a check valve 50 disposed inside the plunger 40, a coil spring 60 as biasing unit accommodated inside an oil pressure chamber 11 formed between the bottom 32 of the sleeve 30 and the rear end of the plunger 40 such as to be able to expand and contract and to bias the plunger 40 toward a front side (to protrude), a resilient ring 70 that restricts the retracting movement of the plunger 40, and a stopper pin 80 that temporarily stops the advancing movement of the plunger 40.

Hereinafter, various constituent elements of the tensioner 10 will be described with reference to the drawings.

Figure 3:
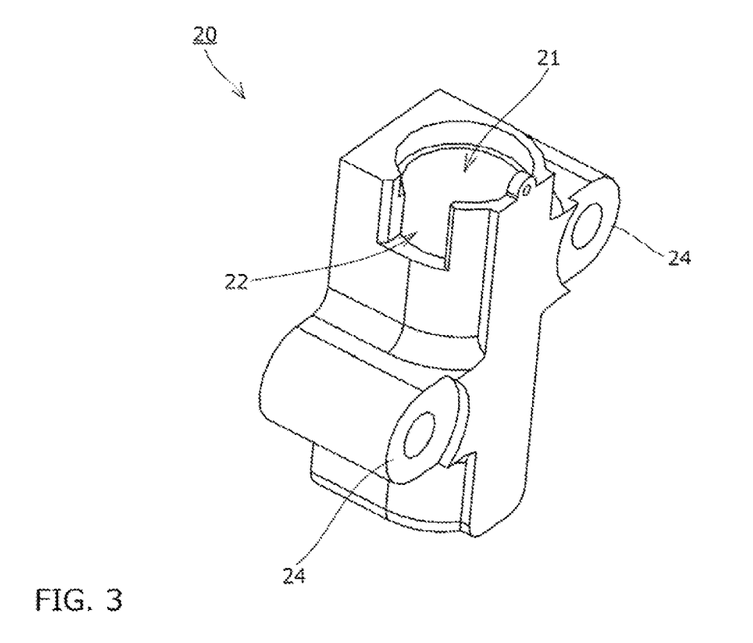
FIG. 3 is a perspective view illustrating a tensioner body.
Figure 7:
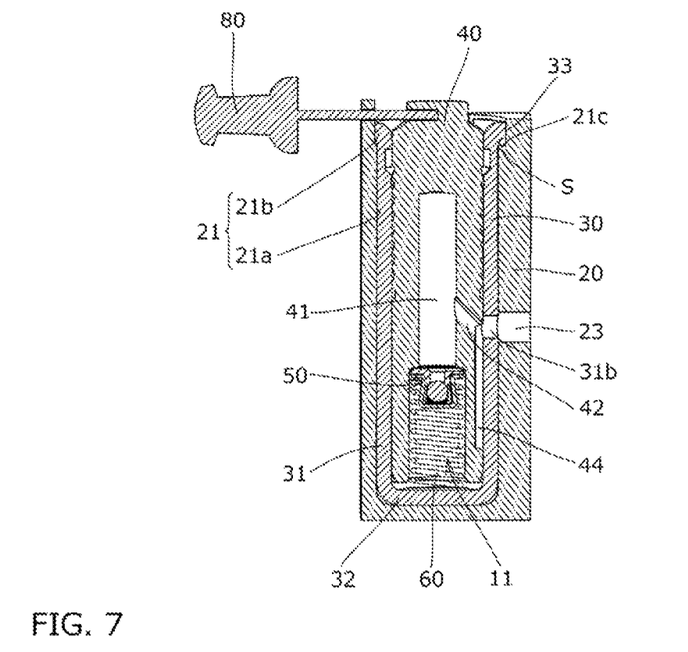
FIG. 7 is a cross-sectional view illustrating the tensioner.

The tensioner body 20 is made from an aluminum alloy, synthetic resin, and the like, and includes, as shown in FIGS. 3 and 7, the cylindrical body hole 21 having one open end (front side), a cut-out indentation 22 formed by cutting out a circumferential portion of the front end of the tensioner body 20 toward the rear side, an oil supply hole 23 that extends through an outer wall of the tensioner body 20 to the cylindrical body hole 21, and a mounting part 24 having a mounting hole for a bolt or the like to be passed through to secure the tensioner body 20 to an engine block. The cut-out indentation 22 is continuous with the cylindrical body hole 21.

The cylindrical body hole 21 includes a small-diameter part 21a in which a sleeve body 31 is disposed, and a large-diameter, part 21b which is formed on the front side of the small-diameter part 21a, and in which a flange part 33 is disposed, as shown in FIG. 7. The small-diameter part 21a and large-diameter part 21b are formed to be concentric with each other.

The inner circumferential wall of the cylindrical body hole 21 includes an inner wall step 21c formed between the inner circumferential wall of the small-diameter part 21a and the inner circumferential wall of the large-diameter part 21b.

Figure 4:
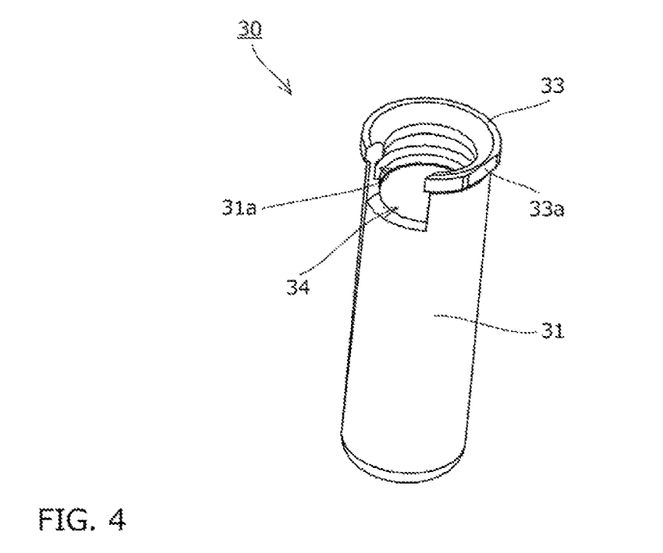
FIG. 4 is a perspective view illustrating a sleeve.
Figure 5:
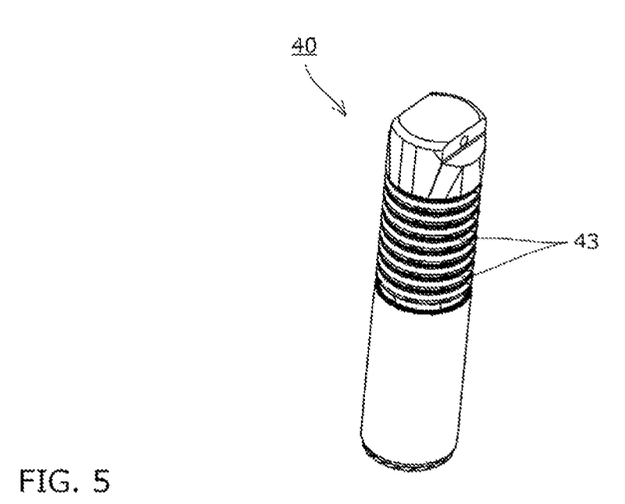
FIG. 5 is a perspective view illustrating a plunger.

The sleeve 30 is made from a metal such as iron or the like and includes the cylindrical sleeve body 31, the bottom 32 formed at the rear end of the sleeve body 31, and the flange part 33 formed at the front end of the sleeve body 31 such as to extend radially outward, these all being in one piece, as shown in FIGS. 4 and 7.

In the inner circumferential wall of the sleeve body 31 is formed a ring accommodating part 31a for accommodating the resilient ring 70 as shown in FIGS. 4 and 7, and this ring accommodating part 31a is formed large enough to allow an annular resilient portion 71 of the resilient ring 70 to increase in diameter when a pair of arms 72 to be described later of the resilient ring 70 are operated.

In this embodiment, the ring accommodating part 31a is formed as an annular groove cut out in the inner circumferential wall of the sleeve body 31. However, the ring accommodating part 31a may have other specific forms as long as it is large enough to accommodate the annular resilient portion 71 as well as to allow radial expansion of the annular resilient portion 71. For example, the sleeve body 31 may be designed to have a larger inner wall diameter at the front end, and this large-diameter part may be used as the ring accommodating part 31a.

The sleeve body 31 is formed with an oil supply hole 31b that extends therethrough between the inner circumference and the outer circumference.

The sleeve 30 has a cut-out indentation 34 formed by cutting out a circumferential portion of the front end of the sleeve body 31 and flange part 33 toward the rear side, as shown in FIG. 4.

Figure 6:
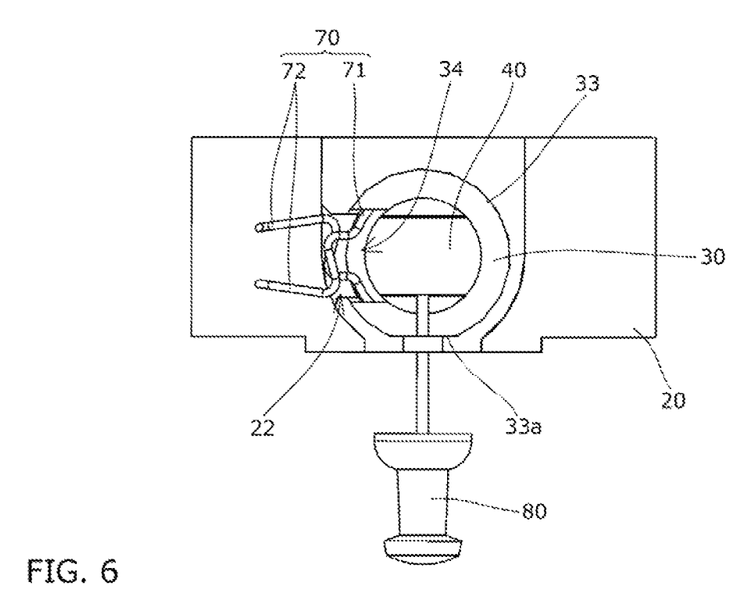
FIG. 6 is a plan view illustrating the tensioner viewed from the front side.

An anti-rotation portion 33a is formed by cutting out an outer circumferential part of the flange part 33, as shown in FIGS. 4 and 6. The inner circumferential wall of the large-diameter part 21b of the cylindrical body hole 21 has a shape conforming to the outer circumference of the flange part 33 that is formed with the anti-rotation portion 33a. The sleeve 30 is stopped from rotating relative to the tensioner body 20 by the anti-rotation portion 33a making circumferential engagement with the inner circumferential wall of the cylindrical body hole 21. When the sleeve 30 is stopped from rotating relative to the tensioner body 20, the cut-out indentation 22 of the tensioner body 20 and the cut-out indentation 34 of the sleeve 30 are located in the same circumferential position, and the oil supply hole 23 of the tensioner body 20 and the oil supply hole 31b of the sleeve 30 are located in the same circumferential position.

The anti-rotation portion 33a may be formed by cutting off part of the flange part 33, or, formed on the flange part 33 by press-forming. While the anti-rotation portion 33a is formed by cutting out an outer circumferential part of the flange part 33 in this embodiment, the specific form of the anti-rotation portion 33a is not limited to this. For example, a protrusion may be formed on the outer circumference of the flange part 33, and this protrusion may be used as the anti-rotation portion 33a.

The plunger 40 is made from a metal such as iron or the like. The check valve 50 is disposed inside the plunger 40 as shown in FIG. 7, with an oil reservoir chamber 41 being formed on the front side thereof.

In the plunger 40 is formed, as shown in FIG. 7, an oil supply hole 42 that extends through the plunger 40 from the outer circumferential surface to the oil reservoir chamber 41 on the inner circumferential side. A connection/adjustment indentation 44 is formed in the outer circumferential surface of the plunger 40 so as to provide an oil passage between the inner circumferential surface of the sleeve body 31 and the outer circumferential surface of the plunger 40, as shown in FIG. 7.

The coil spring 60 is disposed such that its rear end is seated on the bottom 32 of the sleeve 30 while its front end is seated on the outer periphery of a retainer of the check valve 50 so as to bias the plunger 40 to the front side, as shown in FIG. 7.

The resilient ring 70 includes the annular resilient portion 71 and a pair of arms 72 extending from both ends of the annular resilient portion 71 as shown in FIG. 6. The annular resilient portion 71 is disposed between the ring accommodating part 31a of the sleeve body 31 and the outer circumferential surface of the plunger 40, and restricts the retracting movement of the plunger 40 by making engagement with a plurality of annular grooves 43 that are formed to provide serrations on the outer circumferential surface of the plunger 40.

The pair of arms 72 are passed through the cut-out indentations 22 and 34 formed to the tensioner body 20 and the sleeve 30, respectively, and partially positioned outside of the tensioner body 20, as shown in FIG. 6.

The check valve 50 allows the oil to flow from the oil reservoir chamber 41 into the oil pressure chamber 11 while stopping the oil from flowing from the oil pressure chamber 11 into the oil reservoir chamber 41. As shown in FIG. 7, the check valve is made up of a ball seat, a check ball capable of making tight contact with the oil passage in the ball seat, and the retainer that guides the check ball.

Figure 2:
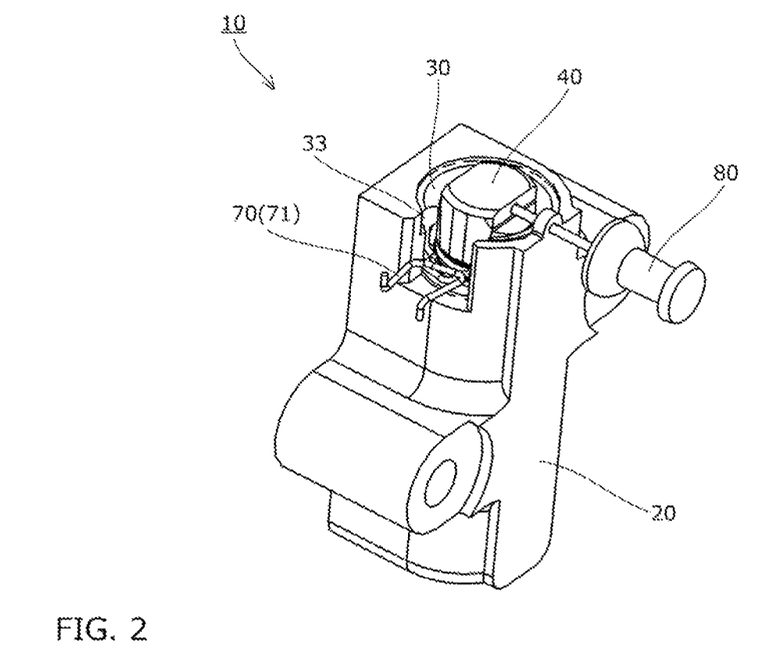
FIG. 2 is a perspective view illustrating the tensioner.

The stopper pin 80 is inserted into holes formed in the tensioner body 20 and the plunger 40 as shown in FIGS. 2 and 6 to temporarily stop the advancing movement of the plunger 40.

In the tensioner 10 configured as described above, as shown in FIG. 7, oil is supplied front outside via the oil supply hole 23, oil supply hole 31b, connection/adjustment indentation 44, oil supply hole 42, and oil reservoir chamber 41 so that the oil pressure chamber 11 is filled with the oil. This oil biases the plunger 40 toward the front side, while the check valve 50 stops the oil from flowing out from the oil supply hole 23. As the plunger 40 reciprocates, the oil flows through the small gap between the plunger 40 and the sleeve 30, and the flow resistance provides the damping effect of slowing down the reciprocal movement of the plunger 40.

The tensioner is configured such that the oil reservoir chamber 41 is provided inside the plunger 40 to supply the oil from the oil reservoir chamber 41 into the oil pressure chamber 11, so that a constant amount of oil is retained in the oil reservoir chamber 41 without leakage, and even immediately after the start-up after a long stop, the oil remaining in the oil reservoir chamber 41 is supplied to the oil pressure chamber 11, to maintain the damping force of oil for the plunger 40 and to prevent vibration or damage of the chain.

Next, a tensioner 10 according to a second embodiment of the present invention will be described with reference to FIG. 8. The second embodiment is, in part, exactly the same as the previously described first embodiment. Therefore, the configuration other than different features will not be described again.

Figure 8:
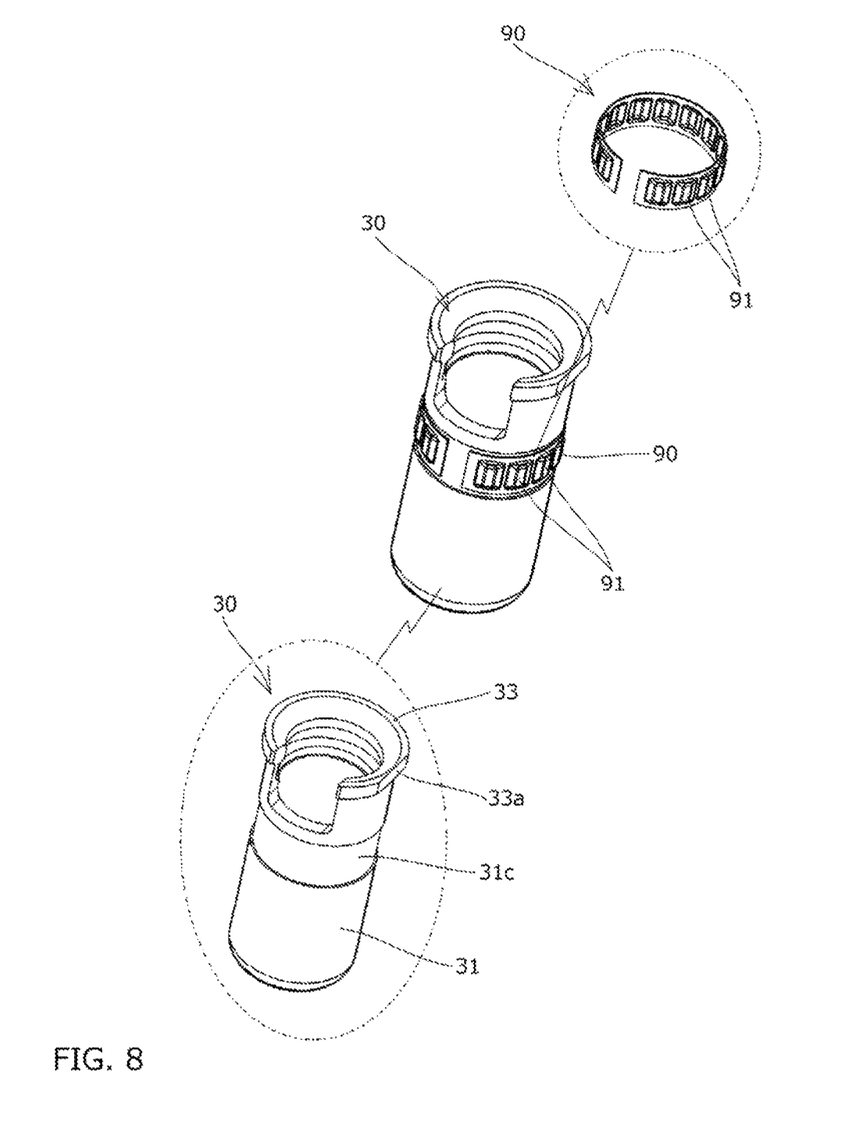
FIG. 8 is an illustrative diagram showing a sleeve and a resilient fit member that form a tensioner of a second embodiment.

In the tensioner 10 of the second embodiment, as shown in FIG. 8, a resilient fit member 90 such as a tolerance ring or the like is disposed between the inner circumferential surface of the cylindrical body hole 21 and the outer circumferential surface of the sleeve body 31. This resilient fit member 90 is formed in an annular shape with a circumferential gap, and has a plurality of bumps 91 protruded radially outward and arranged circumferentially on the outer circumferential surface thereof. An annular groove 31c is formed on the sleeve body 31 by indenting the outer circumferential surface thereof, and the resilient fit member 90 is disposed in this annular groove 31c. When the sleeve 30 is inserted into the cylindrical body hole 21, the resilient fit member 90 is deformed, whereby the sleeve 30 is fixed to the tensioner body 20.

If the sleeve 30 is to be fixed to the tensioner body 20 with the use of the resilient fit member 90 as described above, the anti-rotation portion 33a need not be formed to the flange part 33.

Next, a tensioner 10 according to a third embodiment of the present invention will be described with reference to FIG. 9. The third embodiment is, in part, exactly the same as the previously described first embodiment. Therefore, the configuration other than different features will not be described again.

Figure 9:
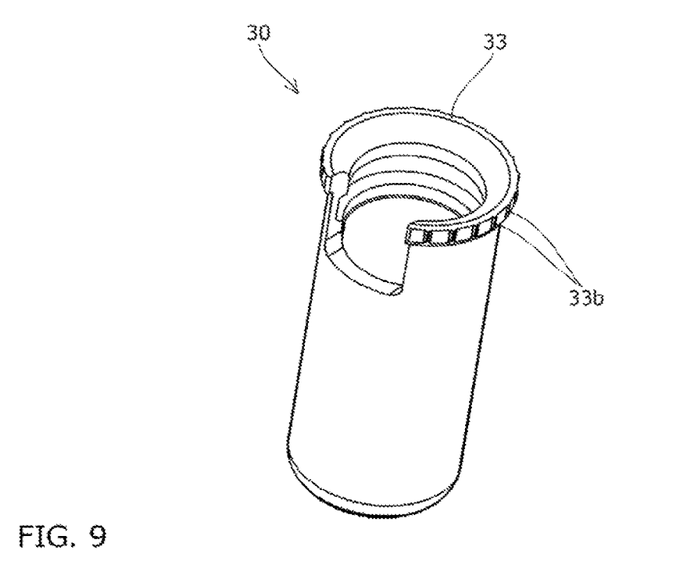
FIG. 9 is a perspective view showing a sleeve that forms a tensioner of a third embodiment.

In the tensioner 10 of the third embodiment, as shown in FIG. 9, the flange part 33 of the sleeve 30 includes a plurality of circumferentially arranged fitting bumps 33b formed by protruding outer circumferential parts thereof, and the flange part 33 formed with the fitting bumps 33b is press-fitted to the inner circumferential wall of the large-diameter part 21b of the cylindrical body hole 21. The fitting bumps 33b can readily be formed to the flange part 33 by press-forming.

Alternatively, the flange part 33 that is not formed with the fitting bumps 33b may be press-fitted to the inner circumferential wall of the large-diameter part 21b of the cylindrical body hole 21.

With the sleeve 30 disposed inside the cylindrical body hole 21, there is formed a gap S between the flange part 33 and the inner wall step 21c that face each other in the axial direction as shown in FIG. 7. This gap S has a volume that is larger than the designed volume of an overlapping portion between the outer circumference of the flange part 33 and the inner circumferential wall of the large-diameter part 21b.

If the flange part 33 is to be press-fitted to the tensioner body 20, the anti-rotation portion 33a need not be formed to the flange part 33.

While embodiments of the present invention have been described in detail, the present invention is not limited to the above-described embodiments and may be carried out with various design changes without departing from the scope of the present invention set forth in the claims.

For example, while the tensioner was described as a component to be incorporated in a timing system of a car engine in the embodiments above, the purpose of use of the tensioner is not limited to this specific application.

Also, while the tensioner was described as a component that applies tension to a transmission chain with s tensioner lever in the embodiments above, the plunger can directly guide the transmission chain slidably with a distal end thereof to apply tension to the transmission chain.

The tensioner may not necessarily be applied to a transmission mechanism with a transmission chain but can also be used for similar transmission mechanisms that use belts, ropes and the like, and can be applied in a variety of industrial fields where it is required to apply tension to an elongated component.

Various configurations of several embodiments described above may be freely combined to form other tensioners.

In the embodiments described above, oil supply holes for supplying oil from the outside of the tensioner are formed in the side faces of the tensioner body, sleeve body, and plunger. However, the specific positions where oil supply holes may be provided are not limited to this design. For example, as in the example shown in FIG. 10, oil supply holes may be formed in the tensioner body and in the bottom of the sleeve so as to supply oil into the plunger.

In the embodiments described above, the cut-out indentation formed by cutting cut part of the front end of the sleeve toward the rear side is used as the indentation for setting the arms of the resilient ring for restricting the retracting movement of the plunger. However, the purpose of use of the cut-out indentation is not limited to this, and, fox example, it may be used for setting a ratchet pawl pivotably attached to the tensioner body to restrict the retracting movement of the plunger.

In the embodiments described above, the tensioner body is formed separately from the engine block and attached to the engine block. Instead, part of the engine block may be used as the tensioner body.

What is claimed is:

1. A tensioner comprising:
a sleeve inserted into a cylindrical body hole with an open end of a tensioner body;
a plunger inserted in the sleeve such as to be able to advance and retract along an axial direction of the sleeve; and
biasing unit for biasing the plunger toward a front side,
the sleeve having, at a front end of a sleeve body thereof, a flange part extending radially outward, and wherein the cylindrical body hole includes a small-diameter part in which the sleeve body is disposed, and a large-diameter part which is formed on a front side of the small-diameter part and in which the flange part is disposed,
an inner circumferential wall of the cylindrical body hole includes an inner wall step formed between an inner circumferential wall of the small-diameter part and an inner circumferential wall of the large-diameter part, and
a gap is formed between the flange part and the inner wall step that face each other in the axial direction.

2. The tensioner according to claim 1, wherein the sleeve has a cut-out indentation formed by cutting out a circumferential portion of the front end thereof toward a rear side.

3. The tensioner according to claim 1, wherein the flange part includes an anti-rotation portion in an outer circumferential part thereof,
the sleeve being stopped from rotating relative to the tensioner body by the anti-rotation portion making circumferential engagement with an inner circumferential wall of the cylindrical body hole.

4. The tensioner according to claim 1, wherein the flange part includes a fitting bump formed by a protruding outer circumferential part thereof, and is press-fitted to an inner circumferential wall of the cylindrical body hole.

5. The tensioner according to claim 1, wherein the gap has a volume larger than a designed volume of an overlapping portion between an outer circumference of the flange part and the inner circumferential wall of the large-diameter part.

6. The tensioner according to claim 1, further comprising an annular resilient fit member disposed between an inner circumferential surface of the cylindrical body hole and an outer circumferential surface of the sleeve body,
wherein the sleeve is fixed to the tensioner body by deforming the resilient fit member.

* * * * *